J. N. BOMMERSBACH.
SPLIT CARNATION MENDER.
APPLICATION FILED APR. 6, 1911.
1,046,143.
Patented Dec. 3, 1912.
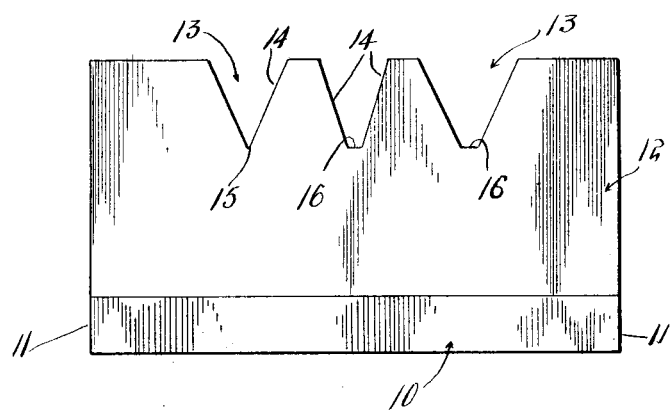
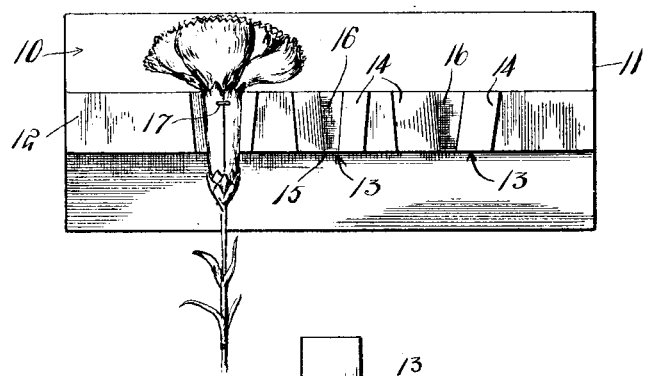
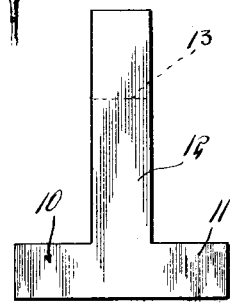

UNITED STATES PATENT OFFICE.

JOHN N. BOMMERSBACH, OF DECATUR, ILLINOIS.

SPLIT-CARNATION MENDER.

1,046,143.  Specification of Letters Patent.  Patented Dec. 3, 1912.

Application filed April 6, 1911. Serial No. 619,358.

*To all whom it may concern:*

Be it known that I, JOHN N. BOMMERSBACH, a citizen of the United States, residing at Decatur, in the county of Macon, State of Illinois, have invented certain new and useful Improvements in Split-Carnation Menders; and I do hereby declare the following to be a full, clear, and exact description of the invention, such as will enable others skilled in the art to which it appertains to make and use the same.

This invention relates to a device for mending split carnations and the principal object is to provide a base and upstanding portion provided with a series of receiving channels of V-form, in which the split calyx of the carnation is adapted to be drawn for the convenient application of a wire staple or other fastening means to hold the split portions of the calyx together.

A still further object is to construct the channels in various sizes with their side faces converging downwardly and toward one side of the upright whereby the calyx of the flower will be properly joined together when drawn through one of the channels for the proper application of the fastening means.

With these and other objects in view the invention consists in certain other combinations and arrangements of parts as will be hereinafter more fully described and claimed, it being a still further object to provide a device which will not be likely to get out of working order.

In the drawings:—Figure 1 is a side elevation of my improved device. Fig. 2 is a top plan view thereof. Fig. 3 is an end elevation of the device.

Referring to the drawings in detail, there is shown a comparatively flat rectangular base member 10 upon which centrally of its width or narrow ends 11 and centrally and longitudinally of its length is secured a vertical upright 12 which is of the same length as the base. The upper edge of the base is provided with a series of V-shaped recesses or channels 13 which extend through its thickness and which are of varying sizes. Each of the channels is formed with downwardly converging sides 14 which meet at one edge as shown at 15 and which have their bottom walls 16 as well as the converging sides 14 also converging toward the opposite side of the upright or body portion 12 at which point the calyx of the flower is disposed therein. The bottom walls 16 are of varying sizes so as to permit the application of flowers of different sizes and in use, the calyx of the carnation or flower is drawn into one of the channels 13 with the split portion disposed upwardly, in the manner shown in Fig. 2 of the drawings, causing the calyx of the flower to be tightly wedged in position and causing the split faces to be brought together and fastened by any suitable means such as a staple 17.

By the provision of a base member, the device may be conveniently placed upon any suitable support and secured if desired, and will also greatly facilitate the mending operation. The provision of a series of channels of various sizes also permits use thereof in a more desirable manner with flowers of different sizes and thereby permits the formation of a more perfect connection of the split parts. It is to be further observed that the upper edges of the channels are spaced apart a greater distance than the normal diameter of the calyx of the carnation or flower thereby permitting the same to be readily placed therein without injury.

I claim:—

An article employed for mending the split calyx of a carnation consisting of a body having a transversely disposed V-shaped channel extending downwardly from the top edge thereof, the walls of the channel converging toward one side of the body to force the split edges of the calyx together as said calyx is being drawn through the channel.

In testimony whereof, I affix my signature, in presence of two witnesses.

JOHN N. BOMMERSBACH.

Witnesses:
W. H. ADAMS,
JAMES J. MORAN.

Copies of this patent may be obtained for five cents each, by addressing the "Commissioner of Patents, Washington, D. C."